US011353636B2

(12) United States Patent
Sullivan et al.

(10) Patent No.: US 11,353,636 B2
(45) Date of Patent: Jun. 7, 2022

(54) MOUNT FEATURES THAT MITIGATE ADHESIVE MIGRATION TO AN OPTICAL ELEMENT

(71) Applicant: Facebook Technologies, LLC, Menlo Park, CA (US)

(72) Inventors: Mark Timothy Sullivan, Mountain View, CA (US); Yaakov Yonatan Layosh, Palo Alto, CA (US); Danilo Bueno, Burlingame, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 341 days.

(21) Appl. No.: 16/752,473

(22) Filed: Jan. 24, 2020

(65) Prior Publication Data

US 2021/0231842 A1    Jul. 29, 2021

(51) Int. Cl.
| | | |
|---|---|---|
| *A47B 96/06* | (2006.01) | |
| *G02B 5/02* | (2006.01) | |
| *F16M 13/02* | (2006.01) | |
| *G02B 7/00* | (2021.01) | |
| *G02B 27/42* | (2006.01) | |

(52) U.S. Cl.
CPC .......... *G02B 5/0294* (2013.01); *F16M 13/02* (2013.01); *G02B 7/00* (2013.01); *G02B 27/42* (2013.01)

(58) Field of Classification Search
CPC ........ G02B 5/0294; G02B 7/00; G02B 27/42; F16M 13/02
USPC ...................................... 248/205.1
See application file for complete search history.

(56) References Cited

U.S. PATENT DOCUMENTS

| | | | |
|---|---|---|---|
| 10,612,912 B1 * | 4/2020 | Sullivan | G06T 7/70 |
| 10,895,752 B1 * | 1/2021 | Romano | G02B 5/1866 |
| 2020/0259982 A1 * | 8/2020 | Bardagjy | H04N 5/2354 |

* cited by examiner

*Primary Examiner* — Todd M Epps
(74) *Attorney, Agent, or Firm* — Fenwick & West LLP

(57) ABSTRACT

A mount includes an active area in which an optical element may be located. The mount is bonded to a neighboring mount using adhesives that are placed on a top side of a wall structure of the mount. Migration of the adhesives from the wall of the mount into the active area is prevented by use of groove-structures and micro-wall structures located in a buffer area of the mount that circumscribes the active area. In some embodiments, a diffuser is located in the buffer area of the mount to redirect the emitted light as desired for a particular application.

20 Claims, 6 Drawing Sheets

MOUNT FEATURES THAT MITIGATE ADHESIVE MIGRATION TO AN OPTICAL ELEMENT

FIELD OF THE INVENTION

This disclosure relates generally to mounts for optical elements, and more specifically to the design and fabrication of mounts for optical elements that include features that mitigate adhesive migration towards the optical elements.

BACKGROUND

Artificial reality systems use a variety of optical elements to serve particular application needs. In these systems, an optical element is held in a support structure called a mount. Typically, a mount is made of a substrate that circumscribes an active area within which the optical element resides. Conventionally, adhesives are used to bond the optical element to the mount and/or the mount to some other structure. In conventional mounts, the adhesive may migrate onto an area of the optical element that would negatively impact performance of the optical element.

SUMMARY

A mount includes an active area in which an optical element (e.g., diffractive optical element (DOE)) may be located. In some embodiments, the mount is bonded to an adjacent mount using adhesives that are placed on a top side of a wall structure of the mount. Migration of the adhesives from the wall of the mount into the active area is prevented by use of groove structures and obstruction structures located in a buffer area of the mount that circumscribes the active area. In some embodiments, a diffuser is located in the buffer area of the mount to redirect the emitted light as desired for a particular application.

In some embodiments, a mount includes wall. The wall of the mount has an outer side, a top side, and an inner side that circumscribes an active area. The active area of the mount is configured to have an optical element. The mount has a buffer area that is located between the wall and the active area. The buffer area is located adjacent to the inner side of the wall, and circumscribes the active area of the mount. The wall of the mount is configured to receive an adhesive on the top side to bond the mount to an adjacent mount. The buffer area has one or more structures that are configured to isolate any leaking adhesives from migrating across the buffer area of the mount and coming in contact with the active area of the mount.

Some embodiments include a device that includes a first mount and a second mount. The first mount includes a wall and a buffer area. The wall of the first mount includes an outer side, a top side, a bottom side, and an inner side circumscribing an active area of the first mount. The active area of the first mount is configured to have an optical element, and the wall is configured to receive an adhesive on the top side to bond the first mount to a second mount. The buffer area on the first mount is located between the wall of the first mount and the active area of the first mount. The buffer area of the first mount is adjacent to the inner side of the wall of the first mount and circumscribes the active area of the first mount. The buffer area of the first mount includes one or more structures configured to isolate any adhesive received on the top side of the wall of the first mount from coming into contact with the active area of the first mount.

The second mount includes a wall and a buffer area. The wall of the second mount includes an outer side, a top side, a bottom side, and an inner side circumscribing an active area of the second mount. The active area of the second mount is configured to hold an optical element. The wall of the second mount is configured to receive an adhesive on the bottom side to bond the mount to the first mount, and the bottom side of the wall of the second mount is configured to come into contact with the adhesive on the top side of the wall of the first mount and bond with the top side of the wall of the first mount. The buffer area on the second mount is located between the wall of the second mount and the active area of the second mount. The buffer area of the second mount is adjacent to the inner side of the wall of the second mount and circumscribes the active area of the second mount.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Artificial reality systems use a variety of optical elements to serve particular application needs. In these systems, an optical element is located in a support structure called a mount. In some embodiments, the mount is made of a substrate. It includes a wall and a buffer area. The buffer area circumscribes the active area and is adjacent to the wall. The optical element is located in the active area of the mount. In embodiments described herein, a mount may have an optical element residing in the active area of the mount as required by an application for performing optical functions such as beam splitting, collimation, etc.

Mounts may be bonded together to form a device that is a composite structure. Two or more mounts may be bonded together in a device. Each of the individual mounts in a device each are configured to have a respective optical element. One or more of the two or more mounts may have a different kind of optical element residing in the active area of the individual mount to suit the requirements of a particular application. The buffer area of a single mount has one or more fiducial markers used for aligning multiple mounts during the process of bonding them together. Bonding is achieved between a pair of mounts during fabrication with the use of adhesives that are placed on top of the wall of the mount. Adhesives used in substrate bonding may be fluidic acrylic adhesives that are specialized for optical and/or electronic component bonding. Such adhesives include, but are not limited to, acrylates and epoxy-based resins that may use visible light, ultraviolet radiation, or heat during a curing process. Other adhesives include low-temperature bonding materials using hydroxide-catalyzed hydration and dehydration and frit bonding.

Embodiments presented herein describe structures that are constructed into the buffer area of the mount substrate to prevent migration of the adhesives across the buffer area of the mount and into the active area of the mount. The structures presented herein may be one or more partial or continuous groove structures etched into the buffer area and one or more partial or continuous protruding obstruction structures such as micro-wall structures or micro-prism structures located on the buffer area, or any combination thereof. In some embodiments, the one or more optical elements may be backlit, and the buffer area may have a diffuser element additionally present to diffuse and/or redirect some of the emitted light. In some embodiments, the diffused light may be redirected into a light monitor. In other embodiments, the one or more of the structures constructed in the buffer areas for adhesive isolation may be combined with diffusive elements in the buffer areas to isolate the adhesives alongside diffusing and/or redirecting some of the emitted light.

Figures 1A, 1B, 1C:
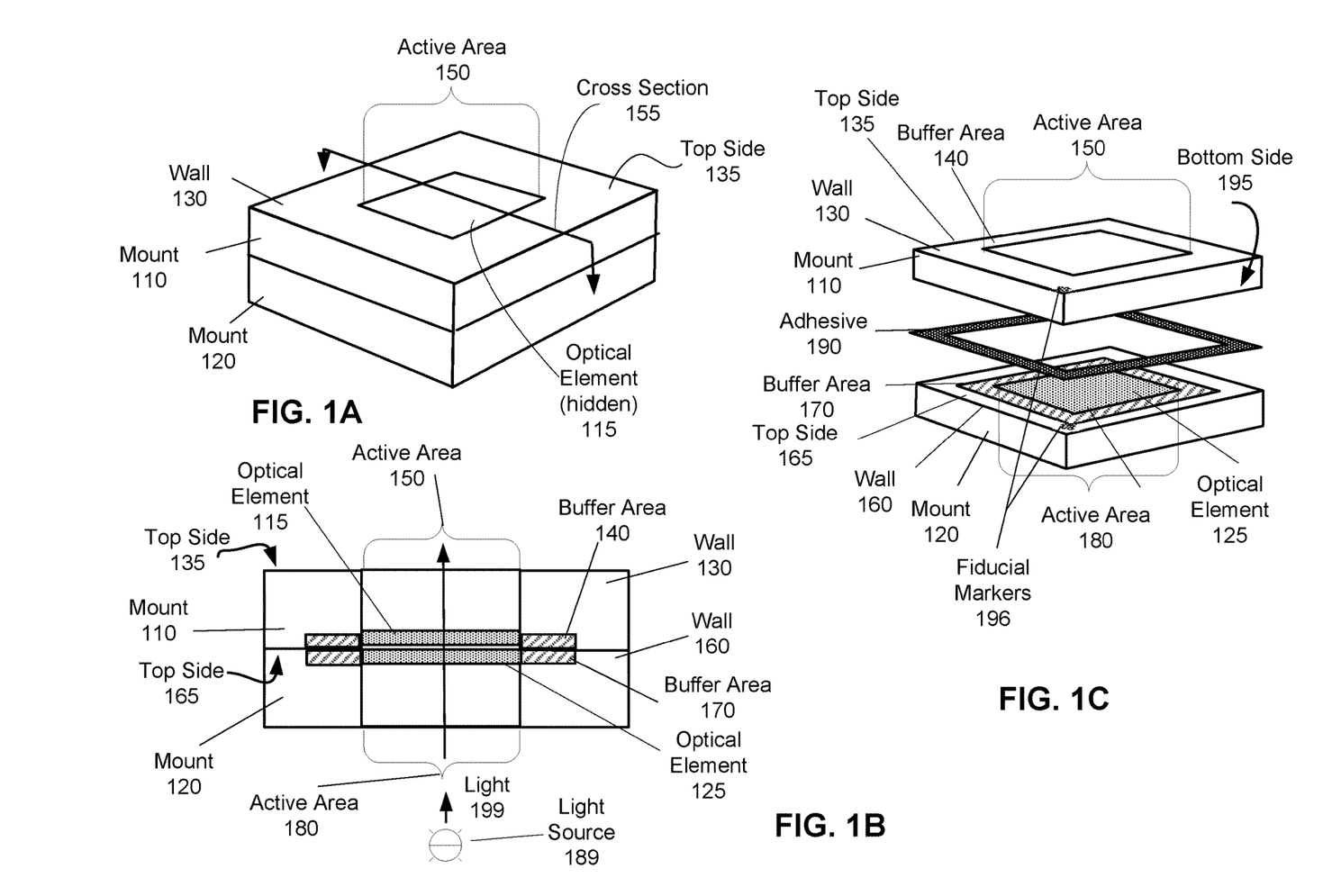
FIG. 1A illustrates a device with two bonded mounts, in accordance with one or more embodiments.
FIG. 1B is a cross-sectional view of the device of FIG. 1A.
FIG. 1C illustrates an exploded view of the device of FIG. 1A.

FIG. 1A depicts a device with two bonded mounts, in accordance with one or more embodiments. It is a perspective view of two mounts, mount 110 and mount 120, that are bonded together to form a device. The mounts 110, 120 are configured to each hold a respective optical element. The mounts 110, 120 each include a wall, a buffer area, and an active area, for example, the mount 110 includes a wall 130, a buffer area 140, and an active area 150. While depicted as a square shape in FIG. 1A, the mounts 110, 120 may be of any shape suitable for an application, e.g., square, rectangular, circular, etc. The mounts 110, 120 may be made of a substrate. The substrate may be made from, e.g., polycarbonate, metal, glass, etc. In some embodiments, one or both of the mounts 110, 120 are monolithic, with the walls, buffer areas, and active areas all being made of a single material such as a polycarbonate or glass. In some embodiments, one or both of the mounts 110, 120 may be composed of a plurality of sub-components, where the mount may be made of one material (metal, polycarbonate, glass, etc.) and the active area may be a separate sub-component that may be made of glass or polycarbonate on which the optical element may be etched or molded on one side that is configured to receive light.

A wall of a mount is an outer structure that circumscribes an inner portion of the mount. The inner portion of the mount includes a buffer area, and is formed to have an active area at its center. For example, the wall 130 of the mount 110 circumscribes the buffer area 140 and the optical element 115, that may be hidden in the depicted perspective view of FIG. 1A.

A buffer area of a mount is a region of the mount between the wall of the mount and an active area of the mount. The buffer area may include structures to prevent migration of the adhesives across the buffer area of the mount and into the active area of the mount. The structures may be one or more groove structures etched into the buffer area, one or more obstruction structures such as micro-wall structures or micro-prism structures that are located on the buffer area, or any combination thereof. In some embodiments, the buffer area may have a diffuser element present to diffuse and/or redirect some emitted light. In other embodiments, the one or more of the structures constructed in the buffer areas for adhesive isolation may be combined with diffusive elements in the buffer areas to isolate the adhesives alongside diffusing and/or redirecting some of the emitted light. These features are discussed in detail below with regard to, e.g., FIGS. 2A-6. The buffer area circumscribes the active area of the mount, and is circumscribed by the wall of the mount. For example, in the illustrated embodiment in FIG. 1A, the buffer area 140 circumscribes the active area 150 of the mount 110.

An active area of a mount is located in an inner portion of the mount. The active area may comprise a solid block that spans the entire or a partial height of the mount such that light may enter the active area on one side of the mount, pass through the active area, and exit on an opposite side of the mount. The active area may be made of solid glass or a solid poly-carbonate material upon which an optical element may be etched or molded onto. The active area may be shaped to have a particular cross section. For example, the active area 150 in FIG. 1A has a rectangular cross section. In other embodiments, the cross section may be circular, square, some other shape, etc.

An optical element provides a desired light control functionality as required for an application. As noted above, each mount 110, 120 is configured to have a respective optical element. For example, the mount 110 holds an optical element 115. An optical element may be, e.g., a lens, a micro-lens array, a filter, a mask, a diffractive optical element (e.g., diffraction grating), etc. Each optical element may be etched or molded onto the top or bottom portion of the active area of the mount. For example, in some embodiments, the mount 120 may have an active area 180 on which the optical element 125 may be located, where the optical element 125 acts as a collimator, while the mount 110 may have an active area 150 on which the optical element 115 may be located, where the optical element 115 may be a diffractive optical element that creates a structured light pattern using the collimated light. In some embodiments, the mount and the active area may all be made of the same material, for e.g., glass, polycarbonate, etc., where the optical element may be etched or molded to cover a portion of the active area, the entire active area, or may cover greater an area that is than the active area. For example, some or all, of the optical element may couple a buffer area and/or wall circumscribing the active area. In some embodiments, the optical elements of the stacked assembly of mounts may be located in the internal portions of the active areas so that the walls of the bonded structure protect the fine and delicate optical elements as well as the buffer areas from contamination and damage. Thus, in FIG. 1A, the optical element 115 may be located in the internal portion of the active area 150 of the mount 110. Thus, while in FIG. 1A the optical element 115 is hidden, in FIG. 1B, the cross-sectional view depicts the optical element 115 located in the internal portion of the active area 150 of mount 110.

FIG. 1A depicts mounts 110 and 120 that are bonded together. Mount 110 is bonded with mount 120 using adhesives. While FIG. 1A depicts a device with two bonded mounts, a device may comprise any number of multiple mounts that are bonded together with adhesives during fabrication. Each of the multiple bonded mounts may have optical elements located in the respective active areas to provide different light control functionalities, e.g., diffraction, beam splitting, collimation, etc. Having such multiple bonded mounts, where each mount may house a different optical element, provides for devices with composite optical functionalities that encompass a variety of optical applications.

FIG. 1B depicts a cross sectional view of the device of FIG. 1A. The mount 120 is substantially similar to the mount 110 in that the mount 120 includes a wall 160, a buffer area 170, and an active area 180. An optical element 125 covers the active area 180. However, in some instances, some or all of the wall 160, the buffer area 170, the active area 180, the optical element 125, or some combination thereof, may differ from the wall 130, the buffer area 140, the active area 150, and the optical element 115, respectively. For example, a wall height may differ between the wall 130 and the wall 160. In some embodiments, the walls 130, 160 may have respective top sides 135, 165 that are level with the respective buffer areas 140, 170 of the respective mounts 110, 120. In other embodiments, either or both of the walls 130, 160 may have respective top sides that are at a different level, e.g., raised higher, than the levels of the respective buffer areas 140, 170 of the respective mounts 110, 120. Likewise, the buffer area 140 may have the same or different features than the buffer area 170. And while in some instances the optical elements 115, 125 may be identical, in other embodiments, they are different (e.g., a diffractive optical element and a collimator).

The active area 150 and the active area 180 respectively span a height of the mount 110 and the mount 120. A light source 189 emits light 199 that may be directed towards the device. The light source could be any source of light that is suitable for a particular optical application. The light 199 enters the active area 180, passes through, and is acted upon by the optical element 125. The light is then acted upon by the optical element 115 which is depicted as being located internally adjacent to the optical element 125, then passes through the active area 150, before exiting the device. In some embodiments, the light source itself may be coupled so the mount, e.g., a vertical cavity surface emitting laser (VCSEL). In these embodiments, the light source mount may have buffer areas such as described with respect to FIG. 2-6.

In some embodiments, adhesives may be placed on the top side 165 of the wall 160 of mount 120 to bond the mount 120 with the mount 110. In order to prevent the adhesives from migrating from the top side of wall 160 of the mount 120 across the buffer area 170 and into the active area 180 of the mount 120, embodiments described herein have structures (not shown), such as groove structures, obstruction structures, or some combination thereof, that are constructed into the buffer area 170 to isolate the migrating adhesives and prevent the migration of the adhesives across the buffer 170 and into the active area 180 of mount 120. These structures are depicted in FIG. 2A-2C, FIG. 3A-3C, and FIG. 4A-4B.

FIG. 1C illustrates an exploded view of the device of FIG. 1A. FIG. 1C depicts an adhesive 190 placed on the top side 165 of the wall 160 of mount 120. In the exploded view, the adhesive layer 190 couples the mount 110 to the mount 120. In some embodiments, adhesives may also be placed on top and/or bottom sides of a pair of mounts in order to achieve bonding between the mounts. During bonding, the bottom side 195 of mount 110 comes into contact with the adhesive on the top side 165 of the wall 160 of mount 120. In order to prevent the adhesive from migrating from the top side of wall 160 of the mount 120 across the buffer area 170 and into the active area 180 of the mount 120, embodiments described herein have structures (not shown), such as etched groove structures or micro-walls, that are constructed into the buffer area 170 to isolate the migrating adhesives and prevent the migration of the adhesives across the buffer 170 and into the active area 180 of mount 120. These structures are depicted in FIG. 2A-2D, FIG. 3A-3C, and FIG. 4A-4B.

Fiducial markers 196 are used to align mounts 110 and 120 during bonding. While fiducial markers 196 are depicted in FIG. 1C as being located on the walls 130 and 160 of respective mounts 110, 120, any number of fiducial markers may be located anywhere on the mount as may be appropriate with respect to an application for the purposes of establishing alignment with neighboring mounts for bonding purposes.

In some embodiments where the optical functionality requires that multiple optical elements be stacked together, the multiple optical elements may each be located in individual mounts that are then stacked together, i.e., greater than the two stacked mounts depicted in FIG. 1C. In such embodiments, adhesives may be applied on both the top side and the bottom side of the walls of a middle mount to stack mounts on both the top side and the bottom side of the middle mount. In these embodiments, buffer areas may be located in both the top and the bottom sides of the wall of each middle mount of the stacked mounts. Furthermore, structures such as groove structures, obstruction structures, or some combination thereof are constructed into these buffer areas to isolate the migrating adhesives and prevent the migration of the adhesives across the buffer regions and into the active areas of the mount from the top side and the bottom side of the mounts.

Adhesive Isolation with Groove Structures

Some embodiments presented herein describe structures that are constructed (e.g., etched) into the buffer area of a mount to isolate the adhesive and prevent migration of the adhesive into the active areas of the mount. The structures presented may be one or more differently shaped groove structures and any combination thereof. FIG. 2A-2C and FIG. 3A-3C depict embodiments of mounts 110 and 120 in FIG. 1A-1C. The depicted embodiments are for purposes of illustration only.

Figure 2A:
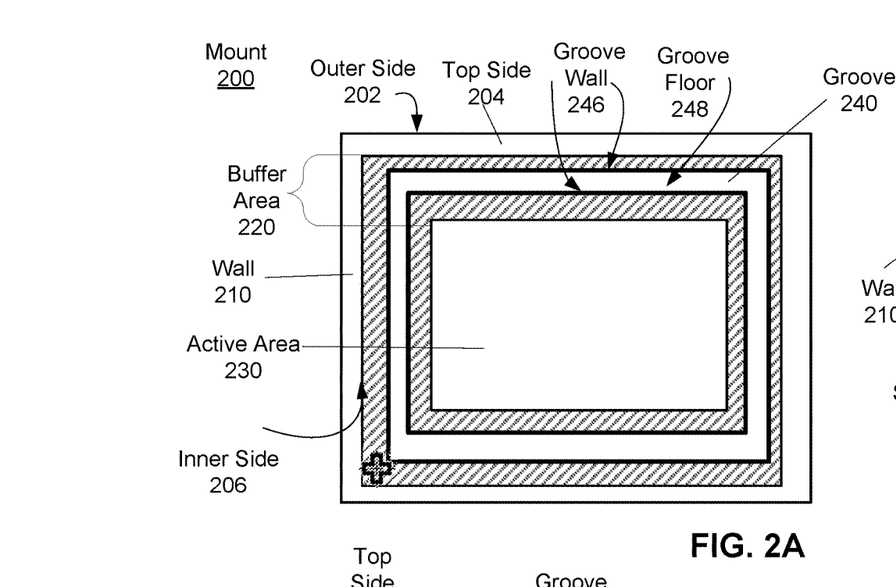
FIG. 2A depicts a top view of a single mount with a groove structure, in accordance with one or more embodiments.

FIG. 2A depicts a top view of a single mount with a groove structure, according to one or more embodiments. The mount 200 is an embodiment of the mount 110 and/or 120. The mount 200 comprises a wall 210, a buffer area 220, and an active area 230. The active area 230 is configured to have an optical element (not shown). The mount 200 may be, e.g., an embodiment of the mount 110 and/or the mount 120. The active area 230 is substantially the same as the active area 150 and/or the active area 160. The wall 210 is an embodiment of the wall 130 and/or 160. The wall 210 comprises an outer side 202, a top side 204, and an inner side 206. In some embodiments, the top side 204 may be level with the buffer area 220. In other embodiments the wall 210 may have a top side 204 that is at a different level, e.g., raised higher, than the level of the buffer area 220.

The buffer area 220 is between the wall 210 and the active area 230. The buffer area 220 is an embodiment of the buffer area 130 and/or the buffer area 170 that includes the groove structure. A groove structure is one or more trenches in the buffer area 220 that are configured to mitigate leakage of adhesives toward the active area 230 and/or an optical element covering the active area 230. A groove structure may include one or more grooves, one or more partial-groove structures, or some combination thereof. In FIG. 2A, the groove structure includes a groove 240. As described with respect to FIG. 1A-1C, adhesives (not shown) may be placed on the top side 204 of the wall 210 of the mount 200 for enforcing bonding with an adjacent mount. In order to prevent the adhesives from migrating across the buffer area 220 and into the active area 230, the groove structure may be etched into the buffer area 220.

The groove 240 may have a square or rectangular cross section that is etched into the substrate in the buffer area 220. The groove 240 is depicted as having a racetrack configuration with continuous groove walls 246 and a continuous groove floor 248 circumscribing the active area 230. The groove 240 receives any adhesives that may leak or migrate from the top side 204 of the wall 210 down the inner side 206 of the wall 210 and across the buffer area 220. The groove 240 prevents leaking and migrating adhesives from coming into the active area 230, where they may come into contact with the optical element located therein. Thus, the groove 240 isolates any leaking adhesives from the top side 204 within the buffer area 220 of the mount 200. A width (W) of the groove 240 and a depth (D) of etching of the groove 240 are chosen so that the groove 240 has sufficient volume to receive all the adhesives that may potentially leak and migrate into it from the top of the wall of the mount. In other embodiments, the groove structure may act as a barrier to inhibit adhesive flow by increasing the surface tension at the adhesive substrate interface. While FIG. 2A depicts an embodiment of the groove 240 as a single groove structure in a continuous racetrack configuration (may be referred to as a continuous groove 240), in other embodiments, the groove 240 may be in other configurations.

Figure 2B:
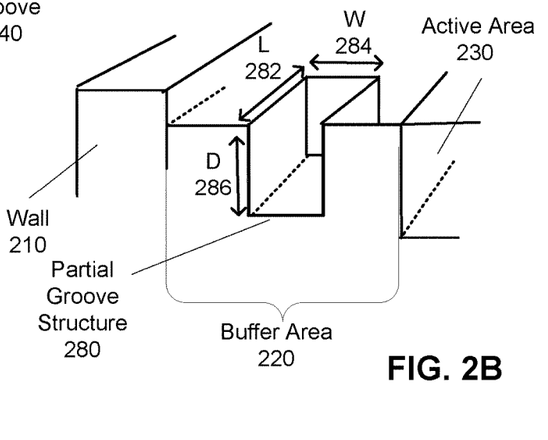
FIG. 2B depicts a perspective partial view of the mount of FIG. 2A with a partial groove structure, in accordance with some embodiments.

FIG. 2B depicts a perspective cross sectional view of the mount 200 with a partial groove structure 280 that may have a square or rectangular cross section, in accordance with some embodiments. The partial-groove structure 280 is depicted as a rectangular trench that is not continuous (e.g. has two ends which are not connected). Thus, the partial-groove structure may have four groove walls and a groove floor. The partial groove structure 280 is located in the buffer area 220 that lies between the wall 210 and the active area 230 of the mount. The partial-groove structure is a trench with a specified length (L 282) and a specified width (W 284) (corresponding to a top-view of the partial-groove structure), and a specified depth (D 286) that is etched into the buffer area. The partial-groove structure is configured so that the area (L 282×W 284) covered by the partial-groove structure is contained within the buffer area 220, with a maximum area covered by a partial-groove structure being the area of the mount that is covered by the buffer area 220. The length, width, and depth of the partial-groove structure are chosen to ensure that the partial-groove structure has a volume (L 282×W 284×D 286) that is sufficient to receive all of the adhesive leaking into it from the wall 210.

In some embodiments, a plurality of partial-groove structures 280 may be distributed within the buffer area 220. In some embodiments, the distribution of the partial-groove structures 280 in the buffer area 220 is such that there is no path from the wall 210 to the active area 230 that does not include at least one partial-groove structure 280. In some embodiments, the location, length, width, and depth of each of the plurality of partial-groove structures 280 may be based on the particulars of adhesive application for a particular multi-mount device, so that there is no path for leaking adhesives from the wall to the active area that does not include at least one partial-groove structure 280.

In some embodiments, each partial-groove structure 280 of the plurality of partial-groove structures distributed in the buffer area 220 may have the same length L 282 and/or the same width 284 and/or the same depth 286 and/or cover the same area (L 282×W 284) in the buffer area 220. In some embodiments, at least some of the partial-groove structures 280 distributed in the buffer area 220 may have different lengths or different widths or different heights. In some embodiments, at least some of the partial-groove structures 280 distributed in the buffer area 220 may be located in the buffer area 220 such that in a top view of the mount 200, the walls of the partial-groove structures are not parallel with the wall 210 of the mount 200.

Figure 2C:
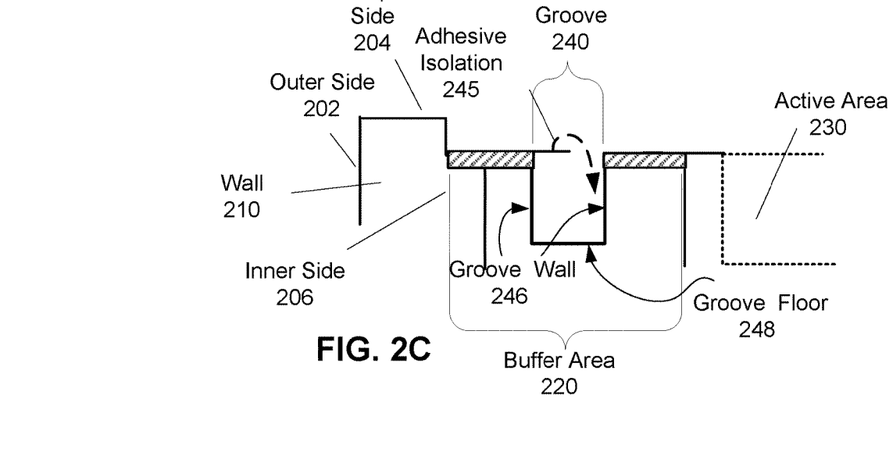
FIG. 2C depicts a partial cross-sectional view of the mount of FIG. 2A, in accordance with some embodiments

FIG. 2C illustrates a partial cross-sectional view of the mount 200 of FIG. 2A. It depicts the wall 210, the buffer area 220, the active area 230, and the groove 240. FIG. 2C depicts an embodiment where the top side 204 is raised above the level of buffer area 220. In alternate embodiments, the top side 204 of the wall 210 may be level with the buffer area 220. The groove 240 is depicted etched into the substrate in the buffer area 220, with groove walls 246 and a groove floor 248. The groove 240 is configured to receive leaking and migrating adhesives, and isolate them within the groove 240, depicted as adhesive isolation 245. While FIG. 2B depicts the groove 240 located in the central portion of the buffer area 220, in other embodiments, the groove may be located anywhere in the buffer area 220. In some embodiments, the width of the groove 240 may encompass any width within the buffer area 220, including encompassing the entire width of the buffer area 204, with one side of the groove 240 coincident with the inner side 206 of the wall 210 and the opposite side of the groove 240 bordering the active area 230. In some embodiments, the groove walls 246 may lie in planes that are not parallel to the plane of the inner side 206 of the wall 210.

Figure 2D:
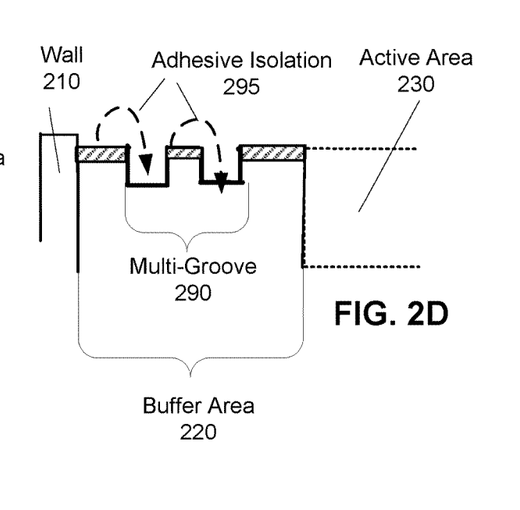
FIG. 2D illustrates a cross section of a portion of the mount of FIG. 2A with a buffer area including a multi-groove structure having a plurality of grooves, in accordance with one or more embodiments.

FIG. 2D illustrates a partial cross-sectional view of the mount 200 in FIG. 2A with the buffer area 220 including a groove structure having a plurality of grooves.

The groove structure in FIG. 2D includes a multi-groove 290. Multi-groove 290 may comprise a plurality of grooves located adjacent to each other that may each have a square or rectangular cross section, where the multiple grooves are etched into the substrate of the mount 200 in the buffer area 220. The multi-groove 290 isolates the adhesives leaking from the top side of the wall 210 of the mount 200 from migrating towards or coming into the active area 230 or an optical element covering the active area 230. This isolation is depicted as adhesive isolation 295. The multi-groove 290 is configured to have a volume to receive all the adhesives that may potentially leak and migrate into it from the top side of the wall 210. In other embodiments, the multi-groove 290 may also act as a barrier to inhibit adhesive flow by increasing the surface tension at the adhesive substrate interface.

In some embodiments, the multi-groove 290 may be a continuous double racetrack configuration circumscribing the active area 230 of the mount 200. In some embodiments, the multi-groove 290 may be a configuration with any number of continuous racetracks circumscribing the active area 230. In some embodiments, individual groove walls (not shown) may lie in planes that are not parallel to each other or to the plane of the inner side (not shown) of the wall 210.

Figure 3A:
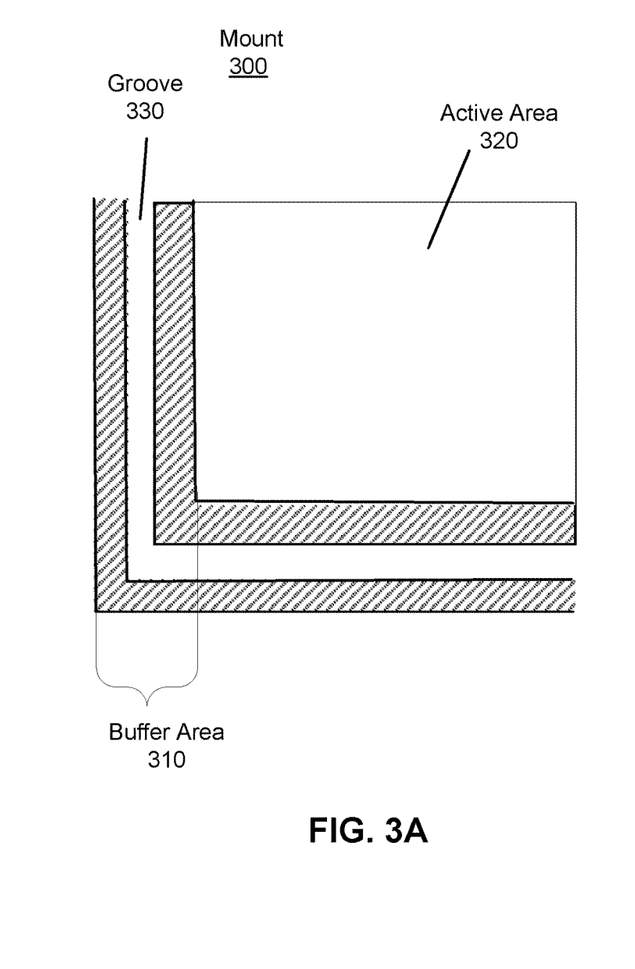
FIG. 3A depicts a top view of a portion of a mount with a groove structure, in accordance with one or more embodiments.

FIG. 3A depicts a top view of a portion of a mount 300 with a groove structure, according to one or more embodiments. The mount 300 is an embodiment of the mount 110 and/or 120. The mount 300 has a wall (not shown), an active area 320, and a buffer area 310. The wall (not shown) is substantially similar to the wall 130 and/or 160 of FIG. 1A-1C. The active area 230 is substantially similar to the active area 150 and/or 180 of FIG. 1A-1C.

The buffer area 310 is an embodiment of the buffer area 130 and/or the buffer area 170 that includes the groove structure. The groove structure depicted in FIG. 3A-C includes a groove 330 with a V-shaped cross section. Thus, the groove structure may have two sloped groove walls that meet at the specified depth (D) in the buffer area 310. The groove structure is configured to mitigate leakage of adhesives toward the active area 320 and/or an optical element covering the active area 320. The groove structure may include one or more grooves 330, one or more partial-groove structures, or some combination thereof. In FIG. 3A, the groove structure includes a groove 330.

The groove 330 is etched into the buffer area 310 in a continuous racetrack configuration circumscribing the active area 230. The groove 330 is designed to receive any adhesives that may leak or migrate from the top side (not shown) of the wall (not shown) of the mount 300 where it is applied to bond the mount 300 with an adjacent mount. Thus, the groove 330 isolates adhesives applied on the top side of the mount wall from migrating across the buffer area 310 and coming in contact with the active area 320. A width (W) of the groove 330 and a depth (D) of etching of the groove 240 are chosen so that the groove 330 has sufficient volume to receive all the adhesives that may potentially leak and migrate into it from the top of the wall of the mount. In other embodiments, the groove 330 may also act as a barrier to inhibit adhesive flow by increasing the surface tension at the adhesive substrate interface.

While FIG. 3A depicts an embodiment of the groove structure as a single groove 330 with a V-shaped cross-section in a continuous racetrack configuration, in other embodiments, the groove 330 may be in other configurations.

In some embodiments, the groove structure may comprise multiple partial-groove structures. The multiple partial-groove structures may each be a V-shaped trench that is not continuous (e.g. has two ends which are not connected). Thus, a partial-groove structure may have two sloped groove walls that meet at the specified depth (D) in the buffer area 310, as well as a specified length (L) and a specified width (W) (corresponding to a top view of the partial-groove structure). The area (L×W) covered by the partial-groove structure is contained within the buffer area 310, with a maximum area covered by a partial-groove structure being the area of the mount that is covered by the buffer area 310. The length, width, and depth of the partial-groove structure are chosen to ensure that the partial-groove structure has a volume (L×W×D) that is sufficient to receive all of the adhesive leaking into it from the wall of the mount 300. The partial-groove structures may also act as a barrier to inhibit adhesive flow by increasing the surface tension at the adhesive substrate interface.

In some embodiments, a plurality of partial-groove structures may be distributed within the buffer area 310. In some embodiments, the distribution of the partial-groove structures in the buffer area 310 is such that there is no path from the wall to the active area 320 that does not include at least one partial-groove structure. In some embodiments, the location, length, width, and depth of each of the plurality of partial-groove structures may be based on the particulars of adhesive application for a particular multi-mount device, so that there is no path for leaking adhesives from the wall to the active area that does not include at least one partial-groove structure.

In some embodiments, each partial-groove structure of the plurality of partial-groove structures distributed in the buffer area 310 may have the same length and/or the same width and/or the same depth and/or cover the same area in the buffer area 310. In some embodiments, at least some of the partial-groove structures distributed in the buffer area 310 may have different lengths or different widths or different depths. In some embodiments, at least some of the partial-groove structures distributed in the buffer area 310 may be located such that in a top view of the mount 300, the buffer-level edges of the partial-groove structures are not parallel with the wall of the mount 300.

Figure 3B:
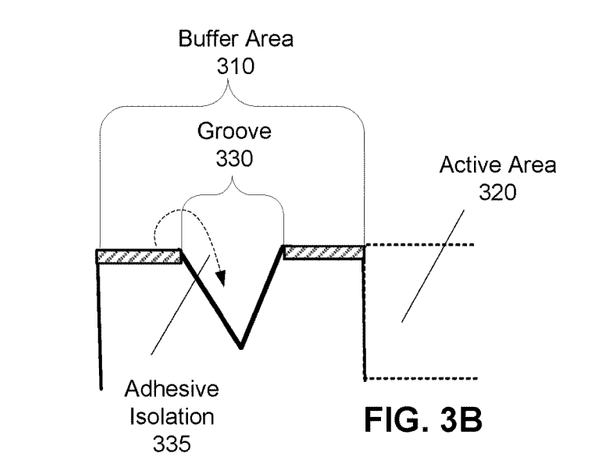
FIG. 3B depicts a partial cross-sectional view of the mount of FIG. 3A.

FIG. 3B illustrates a partial cross-sectional view of the mount 300 of FIG. 3A. It depicts the buffer area 310, the active area 320, and the groove 330. The groove 330 is etched into the substrate of the mount 300 in the buffer area 310. The cross-sectional view of the groove 330 in FIG. 3B is depicted as a V-shaped cross-section. Any leaking adhesives from the top side of the wall are isolated in the groove 330, shown as adhesive isolation 335, and are thereby prevented from migrating towards or coming in contact with the active area 320. While FIG. 3B depicts the groove 330 as being located approximately in the central portion of the buffer area 310, in alternate embodiments, the groove may be located anywhere on the buffer of the mount. In some embodiments, the width of the top of the groove may encompass any width within the buffer area 310, including encompassing the entire buffer width.

Figure 3C:
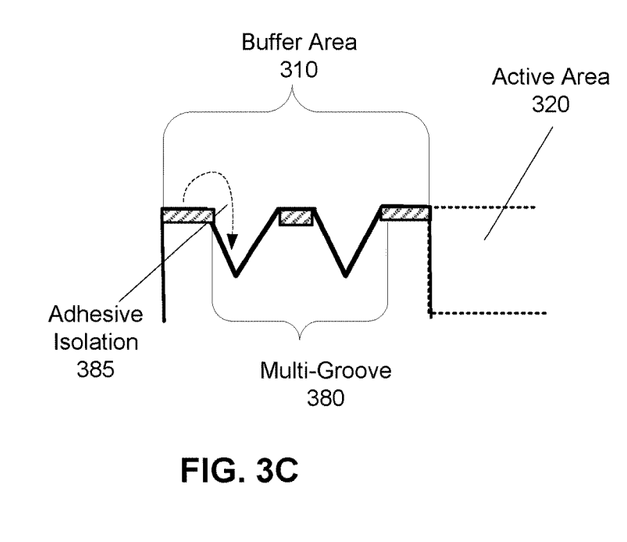
FIG. 3C depicts a partial cross-sectional view of the mount of FIG. 3A with the buffer area including a multi-groove structure having a plurality of grooves, in accordance with one or more embodiments.

FIG. 3C illustrates a partial cross-sectional view of the mount 300 in FIG. 3A with the buffer area 310 including a groove structure having a plurality of grooves.

The groove structure in FIG. 3C includes a multi-groove 380. Multi-groove 380 may be etched into the substrate of the mount 300 in buffer area 310. The multi-groove 380 isolates the adhesives leaking from the top side of the wall of the mount 300 from migrating towards or coming into the active area 320, or an optical element covering the active area 320. This isolation is depicted as adhesive isolation 385. The multi-groove 380 is configured to have a volume to receive all the adhesives that may potentially leak and migrate into it (e.g., from a top of a wall of the mount 300). The multi-groove 380 may also act as a barrier to inhibit adhesive flow by increasing the surface tension at the adhesive substrate interface.

In some embodiments, the multi-groove 380 may be a continuous double racetrack configuration circumscribing the active area 320 of the mount 300. In some embodiments, the multi-groove 380 may be a configuration with any number of continuous racetracks circumscribing the active area 370 of the mount 350.

In various embodiments of mounts 200 and 300, the groove structures that may be located in a buffer of the mount are not limited to rectangular cross sections, e.g., groove 240 and multi-groove 290, as depicted in FIG. 2B-2D, or V-shaped cross-sections, e.g., groove 330 and multi-groove 380, as depicted in FIG. 3B-3C. The groove/groove structures may be any cross-sectional shape that suits the application purposes of a particular mount, e.g., U-shaped, trapezoidal, a partially circular, partially elliptical, etc. In some embodiments, multiple groove structures in a single mount may have differing cross sectional shapes. In some embodiments, there may be multiple groove structures in racetrack configurations located in the buffer of a mount, where each structure may have a different cross-sectional shape.

Adhesive Isolation with Micro-Wall and Micro-Prism Structures

Figure 4A:
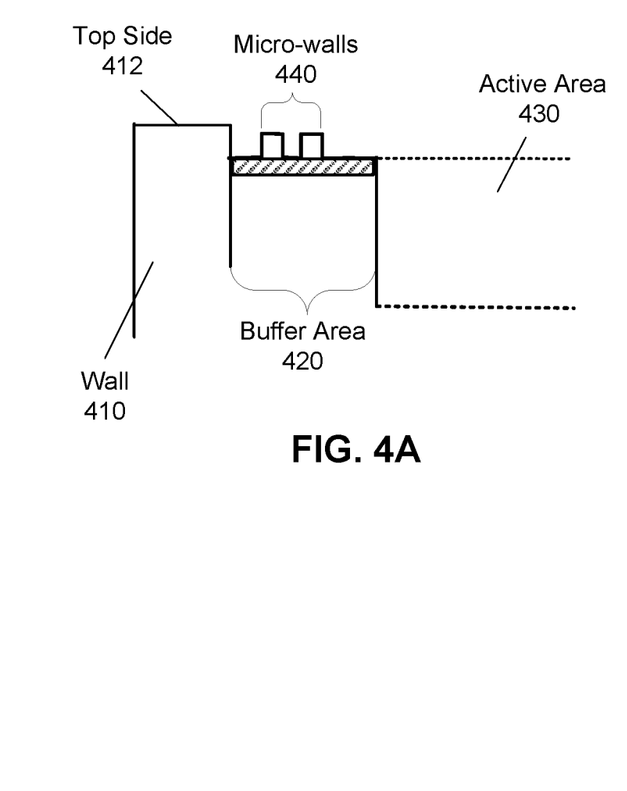
FIG. 4A depicts a partial cross-sectional view of a mount with a buffer area that includes a protruding structure, in accordance with one or more embodiments.
Figure 4B:
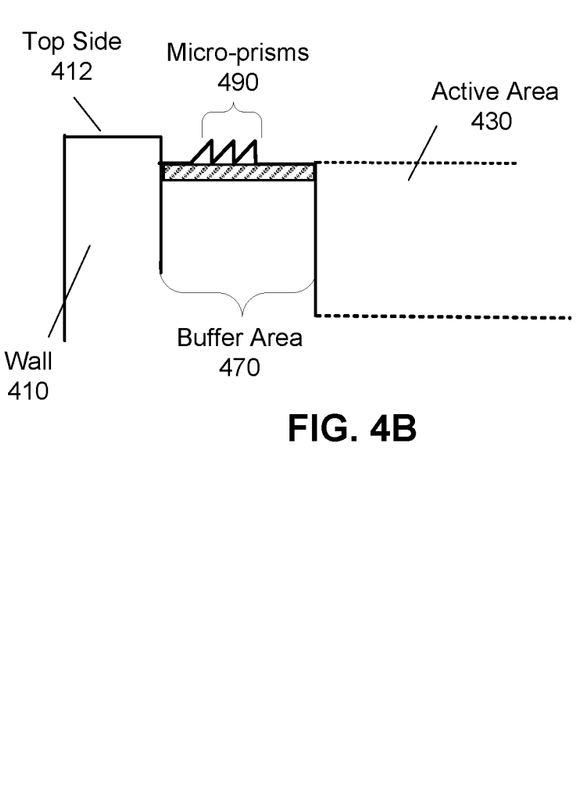
FIG. 4B depicts a partial cross-sectional view of the mount of FIG. 4A, in accordance with one or more embodiments.

Some embodiments presented herein describe protruding structures that are constructed into a buffer area of a mount to isolate bonding adhesives and prevent migration of the adhesives into an active area of the mount. The structures presented may be one or more discrete protrusions distributed throughout the buffer area, one or more partial or continuous protruding micro-wall structures on the buffer area, protruding micro-prism structures on the buffer area, and any combination thereof. FIG. 4A and FIG. 4B depict embodiments of mounts 110 and 120 in FIG. 1A-1C. The depicted embodiments are for purposes of illustration only.

FIG. 4A depicts a partial cross-sectional view of a mount with a buffer area that includes a protruding structure, according to one or more embodiments. The mount may be, e.g., an embodiment of the mount 110 and/or the mount 120. The mount comprises a wall 410, a buffer area 420, and an active area 430. The wall 410 is an embodiment of the wall 130 and/or the wall 160. The active area 430 is an embodiment of the active area 150 and/or 180. The buffer area 420 is an embodiment of the buffer areas 140 and 170 that includes the protruding structure. The protruding structure is one or more protrusions in the buffer area 310 that are configured to mitigate leakage of adhesives toward the active area 430 and/or an optical element covering the active area 430. The protruding structure may include one or more micro-walls, one or more micro-prisms, one or more protrusions of some other shape, or some combination thereof. In FIG. 4A, the protruding structure includes a micro-wall 440.

The micro-walls 440 are located in the buffer area 420. The micro-walls 440 are designed to act as an impediment to any adhesives that may leak or migrate from the top side 412 of the wall 410 down the inner side of the wall 410 and across the buffer area 420. The micro-walls 440 prevent leaking and migrating adhesives from coming into the active area 430, where they may come into contact with the optical element located therein. Thus, the micro-walls 440 isolate any leaking adhesives from the top side 412 within the buffer area 420 of the mount. The micro-walls 440 are configured to be of a height such that all the adhesives that may potentially leak and migrate towards it from the top of the wall of the mount may be blocked from coming into contact with the active area 430. In other embodiments, the multi-walls 440 may also act as a barrier to inhibit adhesive flow by increasing the surface tension at the adhesive substrate interface. In some embodiments, the micro-wall 440 may be configured as one or more continuous wall structures in a continuous racetrack configuration circumscribing the active area 430.

FIG. 4B illustrates a partial cross-sectional view of the mount of FIG. 4A, in accordance with one or more embodiments. The buffer area 420 of the mount includes a protruding structure having a plurality of micro prisms 490 to obstruct the passage of leaking adhesives towards the active area 430.

The micro-prisms 490 are located in the buffer area 470. The micro-prisms 490 are wall-like obstruction structures that protrude from the mount substrate in the buffer area 420. The micro-prisms 490 are designed to act as an impediment to any adhesives that may leak or migrate from the top side 412 of the wall 410 down the inner side of the wall 410 and across the buffer area 420. The micro-prisms 490 mitigate leakage of adhesives toward the active area 430 and/or an optical element covering the active area 430. Thus, the micro-prisms 490 isolate any leaking adhesives from the top side 412 within the buffer area 420 of the mount 450. The micro-prism 490 is configured to be of a height such that all the adhesives that may potentially leak and migrate towards it from the top of the wall of the mount may be blocked from coming into contact with the active area 430. The micro-prisms 490 may also act as a barrier to inhibit adhesive flow by increasing the surface tension at the adhesive substrate interface. In some embodiments, the micro-prism 490 may be configured as one or more continuous wall structures in a continuous racetrack configuration circumscribing the active area 430. In some embodiments, the micro-prism 490 may also be a plurality of discrete post-like prisms distributed in the buffer area 420 with greater spacing between the individual prisms that are located in the buffer area 420 near the wall 410 and lesser spacing between the individual prisms that are located in the buffer area 420 near the active area 430.

In other embodiments, the protruding structures, e.g., micro-walls 440 in FIG. 4A and the micro-prisms 490 in FIG. 4B, may have any cross-sectional shape that suits the purposes of a particular mount application, e.g., a trapezoid, a partially circular, partially elliptical, etc.

In some embodiments, the protruding structure may comprise multiple partial-obstruction structures. A partial-obstruction structure may be, e.g., a micro-wall or a micro-prism that is not continuous (e.g. has two ends which are not connected). The measurements of the partial-obstruction structure may be chosen to ensure that the structure will obstruct all of the adhesive leaking towards it from the wall of the mount from moving into the active area 430, or towards the optical element covering the active area 430. The partial-obstruction structure is configured to be located completely within the buffer area 420, with a maximum area covered by a partial-obstruction structure being the area of the mount that is covered by the buffer area 420.

In some embodiments, a plurality of partial-obstruction structures may be distributed within the buffer area 420. In some embodiments, the distribution of the partial-obstruction structures in the buffer area 420 is such that there is no path from the wall to the active area 430 that does not include at least one partial-obstruction structure. In some embodiments, the location, length, width, and height of each of the plurality of partial-obstruction structures may be based on the particulars of adhesive application for a particular multi-mount device, so that there is no path for leaking adhesives from the wall to the active area that does not include at least one partial-obstruction structure.

In some embodiments, each partial-obstruction structure of the plurality of partial-obstruction structures distributed in the buffer area 420 may have the same length and/or the same width and/or the same height and/or cover the same area in the buffer area 420. In some embodiments, at least some of the partial-obstruction structures distributed in the buffer area 420 may have different lengths or different widths or different heights. In some embodiments, at least some of the partial-obstruction structures distributed in the buffer area 420 may be located in the buffer area such that, in a top view of the mount, the partial-obstruction structures are not parallel with the wall 410 of the mount.

Adhesive Isolation and Optical Diffusion

In some embodiments, an optical diffuser is additionally placed in the buffer area of a mount in order to diffuse light in a desired manner for the particular mount application. For example, the optical diffuser may be used to smooth the irregularities in an emitted optical beam profile and create a more uniform optical beam. In some embodiments, the optical diffuser may be used to redirect an impinging beam onto a specific region, such as a light monitor. In some embodiments, the optical diffuser may be molded directly into the mount substrate, with diffractive optical properties present in the active area, as well as walls of the mount. In some embodiments, where the optical element covers only a part of the active area, the optical diffuser may be molded directly into parts of the active area that do not have the optical element. In some embodiments, the diffusive properties may be introduced by roughening the surface of the substrate. In various embodiments, the mount features may be made using injection compression molding, embossing, nan-imprinting, etching, grinding, polishing, etc., or some combination thereof.

Figure 5A:
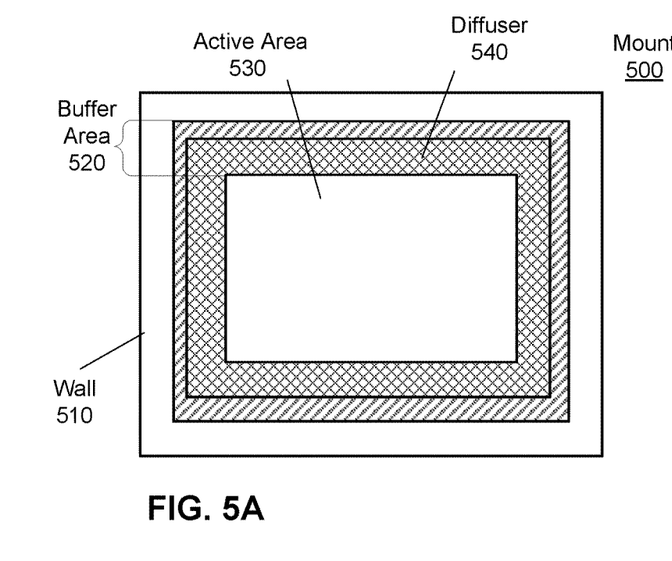
FIG. 5A depicts a top view of a mount, in accordance with one or more embodiments.

FIG. 5A depicts a top view of a mount 500 in accordance with some embodiments. The mount 500 may be, e.g., an embodiment of mount 110 and/or mount 120 in FIG. 1A-FIG. 1C. Mount 500 comprises a wall 510, a buffer area 520, and an active area 530. The wall 510 is an embodiment of the wall 130 and/or 160. The active area 530 is an embodiment of the active area 150 and/or 180. The buffer area 520 is an embodiment of the buffer area 140 and/or 170 that includes a diffuser 540.

The diffuser 540 is located within the buffer area 520 to diffuse light in a desired manner for a particular application. The diffuser 540 may comprise material that is located in the substrate of the mount 500 in the buffer area such that any light 560 impinging on the diffuser material is modified as desired for the particular optical application of the mount 500. The light modification performed by the diffuser 540 comprises any light control modification, e.g., diffusing, scattering, or redirecting the light 560 as suits the application. The diffuser material may be any of a photopolymer, a glass-based material, fused silica, etc., or some combination of these materials.

The diffuser 540 circumscribes the active area 530. While FIG. 5A depicts the diffuser 540 as located partially spanning the width of the buffer area 520, in other embodiments, the diffuser 540 may span the entire width of the buffer area 520 of the mount 500. In some embodiments, the diffuser 540 may not continuously circumscribe the active area 530 but may only be located in partial regions of the buffer area 530 of the mount 500, as dictated by a particular optical application of the mount. In some embodiments, where the diffuser 540 may cover any portion of the active area which does not have the optical element etched or molded or otherwise located on it. In embodiments where the diffuser 540 does not continuously circumscribe the active area 530, the diffuser 540 may comprise non-contiguous partial regions located in the buffer area 520. The non-contiguous partial regions of the diffuser 540 located in the buffer area 520 may all be of a same shape or may be of different shapes. The location of the non-contiguous partial regions of the diffuser 540 in the buffer area 520 may be based on the particular light control and light monitoring requirements of a particular application.

Figure 5B:
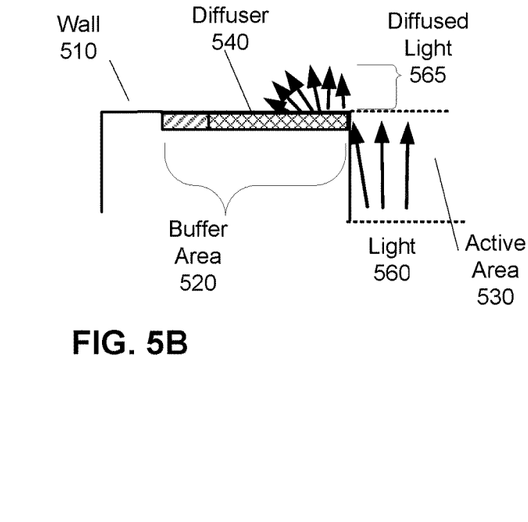
FIG. 5B depicts a partial cross-sectional view of the mount of FIG. 5A, in accordance with one or more embodiments.

FIG. 5B depicts a partial cross-sectional view of the mount 500 of FIG. 5A. The light 560 is directed towards an optical element (not shown) in the active area 530. Any light 560 that impinges on the buffer area 520 away from the active area 530 strikes the diffuser 540. The light passing through the diffuser 540 is acted upon by the diffuser 540 to generate the exiting diffused light 565.

Figure 5C:
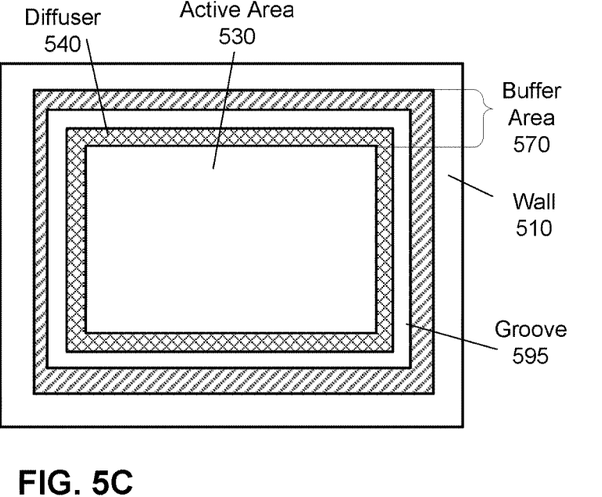
FIG. 5C depicts a top view of the mount of FIG. 5A in which the buffer area includes a diffuser and a groove structure, in accordance with one or more embodiments.

FIG. 5C depicts a top view of the mount 500, in which the buffer area 520 includes the diffuser 540, and a groove structure 595. The diffuser 540 is located such that any light that is not striking the optical element (not shown) in the active area 530 strikes the diffuser 540, similar to the depictions in FIG. 5A and FIG. 5B. Additionally, the groove 595 is located in the buffer area 520, and may be any of the embodiments of the groove depicted in FIG. 2A-2C. The groove 595 receives leaking adhesives from the wall 510 of the mount 500 and prevents the leaking adhesives from migrating across the buffer area 520 towards the diffuser 540 or the active area 530.

In some embodiments, the mount 500 in FIG. 5C may have groove structures such as described in FIG. 3A-3C, and/or obstruction structures such as described in FIG. 4A-4B in addition to or instead of the groove 595 to prevent the leaking adhesives from migrating from the wall 510 of the mount 500 and towards the active area 530.

Figure 5D:
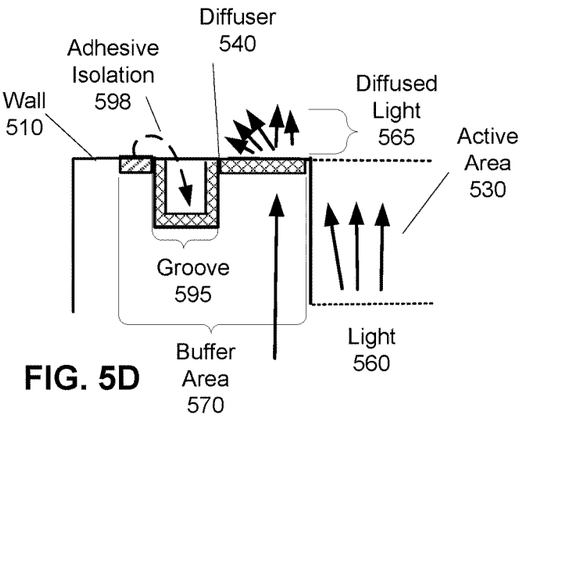
FIG. 5D depicts a partial cross-sectional view of the mount of FIG. 5C, in accordance with one or more embodiments.

FIG. 5D depicts a partial cross-sectional view of the mount 500 of FIG. 5C. Groove 595 is located to perform adhesive isolation 598 so that leaking and migrating adhesives do not come into contact with the active area 530. The diffuser 540 diffuses any imping light 560 that may strike it to generated diffused light 565 as suitable for the optical functionalities of the application. As depicted in FIG. 5D, the diffuser may also be part of the groove 595.

Figure 6:
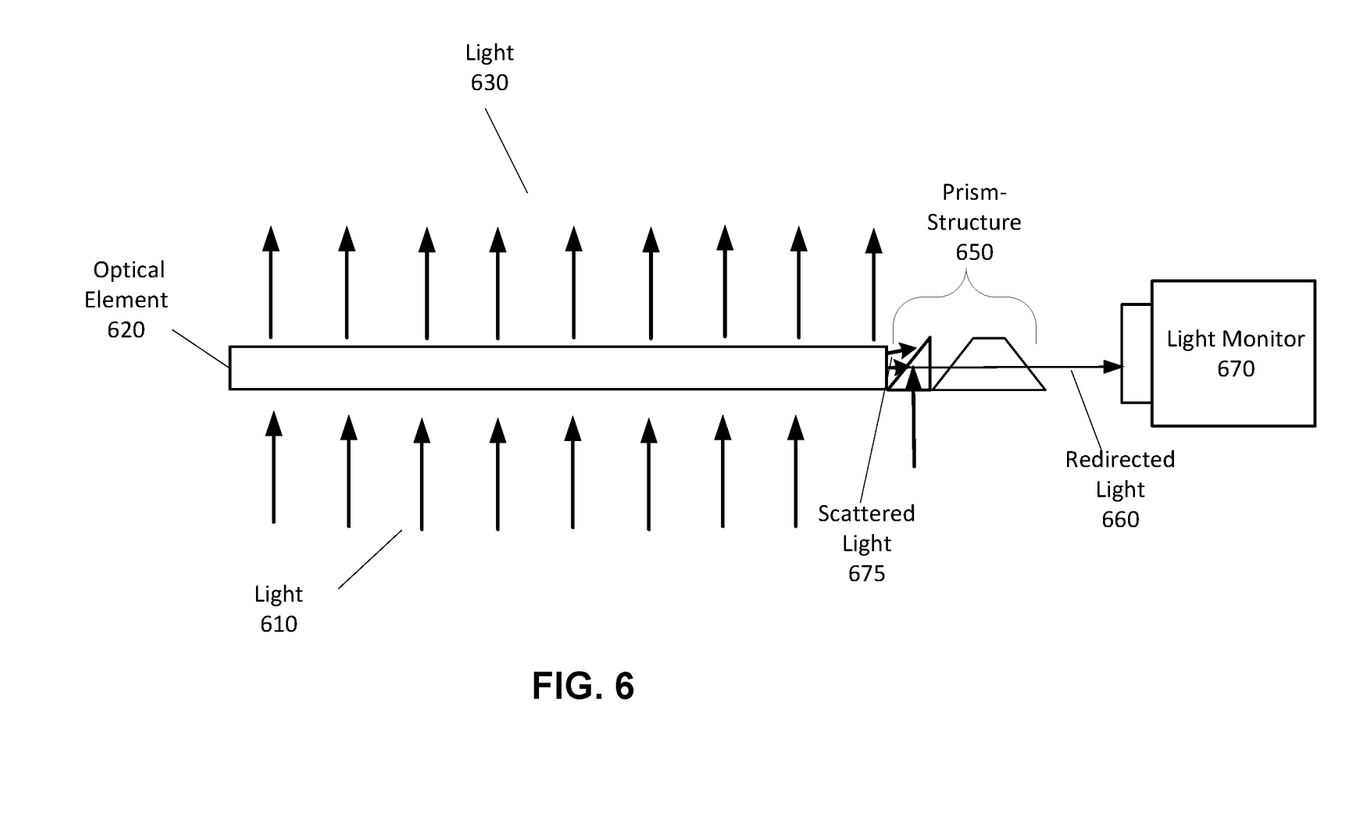
FIG. 6 illustrates a prism structure for monitoring light passing through an optical element affixed to a mount, in accordance with one or more embodiments a mount, in accordance with one or more embodiments.

FIG. 6 illustrates a prism structure 650 for monitoring light passing through an optical element 620 affixed to a mount 600, in accordance with one or more embodiments. The mount that may be an embodiment of mount 110 and/or mount 120 in FIG. 1A-FIG. 1C. The mount comprises a wall (not shown), a buffer area (not shown), an active area (not shown), and a prism-structure 650. The active area is an embodiment of the active area 150 and/or 180, and as shown in FIG. 6, is covered by an optical element 620. The buffer area of the mount may include the prism structure 650. The prism-structure 650 may be an embodiment of the microprism 490 depicted in FIG. 4B.

Light 610 passes through the active area of the mount 600 toward the optical element 620 and away from the optical element 620 as light 630. In some embodiments, some of the light 610 is scattered by the optical element as scattered light 675 toward the prism structure 650. In the illustrated embodiment, the prism structure 650 is positioned such that a portion of it overlaps the active area such that it directly receives a portion of the light 610. In alternate embodiments (not shown), the prism structure 650 is positioned fully within the buffer area.

The prism structure 650 directs some of the light 610 as redirected light 660 to a light monitor 670. The prism structure includes one or more prisms. The one or more prisms may include, e.g., a prism with a triangular cross section (e.g., right angle prism), a prism with a trapezoidal cross section (e.g., a dove prism), equilateral prisms, roof prisms, penta-prisms, dispersing prisms, where the prisms may themselves include diffusive properties, a separate diffuser (e.g., the diffuser 540), or some combination thereof. In addition to redirecting a portion of the light 610 towards the light monitor 670, in some embodiments, the prism structure 650 may also act to isolate any leaking adhesives such as described with respect to embodiments in FIG. 2A-5. In some embodiments, the redirected light 660 is such that it passes through a notch in the wall of the mount to reach the light monitor 670.

The light monitor 670 may be one or more light sensors (e.g., photodetector) located at one or more positions around the sides of the mount such that the light sensors do not impede the light 620 that is passing away from the optical element 630. The light monitor 670 senses the redirected light 660 from the prism structure 650. The readings from the light monitor 670 may be used to calibrate and optimize the functionality of the optical element 620.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereoscopic, or "stereo," video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset, a head-mounted display (HMD) connected to a host computer system, a standalone HMD, a near-eye display (NED), a mobile device or computing system, or any other hardware platform capable of providing artificial reality content to one or more viewers.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A mount comprising:
   a wall of the mount, the wall comprising an outer side, a top side, and an inner side circumscribing an active area, the active area configured to hold an optical element, the wall configured to receive an adhesive on the top side to bond the mount to an adjacent mount; and
   a buffer area on the mount that is located between the wall and the active area, the buffer area adjacent to the inner side of the wall and circumscribing the active area, the buffer area comprising one or more structures configured to isolate the adhesive from coming into contact with the active area.

2. The mount of claim 1, wherein the one or more structures comprise one or more grooves, wherein each of the one or more grooves has any of: a square cross-section, a V-shaped cross-section, a U-shaped cross-section, or a cross-section that comprises a portion of a circle.

3. The mount of claim 2, wherein the one or more grooves comprises one or more continuous grooves, each continuous groove circumscribing the active area in a racetrack configuration.

4. The mount of claim 3, wherein a plurality of continuous grooves is parallel to each other.

5. The mount of claim 4, wherein at least some of the partial-groove structures may be parallel to each other.

6. The mount of claim 2, wherein the one or more grooves comprises one or more partial-groove structures located within the buffer area, and each partial-groove structure is a trench configured to isolate adhesives leaking from the top side of the wall.

7. The mount of claim 6, wherein a length of each of the one or more partial-groove structures in a direction parallel to the wall varies based on a location of the partial-groove structure in the buffer area.

8. The mount of claim 6, wherein a width of each partial-groove structure in a direction that is perpendicular to the wall varies based on a location of the partial-groove structure in the buffer area.

9. The mount of claim 6, wherein each partial-groove structure has a same width.

10. The mount of claim 9, wherein the width of each partial-groove structure comprises the width of the buffer area between the inner side of the wall and the active area.

11. The mount of claim 6, wherein the one or more partial-groove structures is located in the buffer area so that there is no direct path from the wall to the active area which does not cross a partial groove structure.

12. The mount of claim 1, wherein the buffer area further comprises a diffusive surface configured to diffuse light leakage from an optical element located in the active area.

13. The mount of claim 12, wherein the diffusive surface may extend into the one or more structures configured to isolate the adhesive.

14. The mount of claim 12, wherein the one or more structures may be further configured to redirect light leakage from the optical element into a light monitor.

15. The mount of claim 1, wherein the one or more structures comprise one or more protrusions located in the buffer area.

16. The mount of claim 15, wherein the one or more protrusions includes a plurality of discrete protrusions distributed throughout the buffer area.

17. The mount of claim 16, wherein an outer boundary of the buffer area is adjacent to the wall and an inner boundary of the buffer area is adjacent to the active area, and spacings between adjacent protrusions of the plurality of discrete protrusions located at the outer boundary is wider than spacings between adjacent protrusions of the plurality of discrete protrusions located at the inner boundary.

18. The mount of claim 15, wherein the one or more protrusions comprises one or more continuous protrusions that each circumscribe the active area.

19. The mount of claim 18, wherein a continuous protrusion may be one of: a continuous micro-wall or a continuous micro-prism.

20. A device comprising:
a first mount comprising:
a wall of the first mount, the wall of the first mount comprising an outer side, a top side, a bottom side, and an inner side circumscribing an active area of the first mount, the active area of the first mount configured to hold an optical element, the wall configured to receive an adhesive on the top side to bond the first mount to a second mount; and
a buffer area on the first mount that is located between the wall of the first mount and the active area of the first mount, the buffer area of the first mount adjacent to the inner side of the wall of the first mount and circumscribing the active area of the first mount, the buffer area of the first mount comprising one or more structures configured to isolate any adhesive received on the top side of the wall of the first mount from coming into contact with the active area of the first mount; and
the second mount comprising:
a wall of the second mount, the wall of the second mount comprising an outer side, a top side, a bottom side, and an inner side circumscribing an active area of the second mount, the active area of the second mount configured to hold an optical element, the wall of the second mount configured to receive an adhesive on the bottom side to bond the mount to the first mount, and the bottom side of the wall of the second mount configured to come into contact with the adhesive on the top side of the wall of the first mount and bond with the top side of the wall of the first mount; and
a buffer area on the second mount that is located between the wall of the second mount and the active area of the second mount, the buffer area of the second mount adjacent to the inner side of the wall of the second mount and circumscribing the active area of the second mount, the buffer area of the second mount comprising one or more structures configured to isolate any adhesive received on the bottom side of the second mount from coming into contact with the active area of the second mount.

* * * * *

UNITED STATES PATENT AND TRADEMARK OFFICE
CERTIFICATE OF CORRECTION

PATENT NO. : 11,353,636 B2
APPLICATION NO. : 16/752473
DATED : June 7, 2022
INVENTOR(S) : Mark Timothy Sullivan It is certified that error appears in the above-identified patent and that said Letters Patent is hereby corrected as shown below:

On the Title Page

In Column 2, item (57), under Abstract, Line 6, delete "groove-structures" and insert -- groove structures --, therefor.

In the Claims

In Column 17, Claim 11, Line 33, delete "partial groove" and insert -- partial-groove --, therefor.

Signed and Sealed this
Thirtieth Day of August, 2022

Katherine Kelly Vidal
*Director of the United States Patent and Trademark Office*